Sept. 10, 1963      J. E. SMITH      3,103,229

MANIFOLD DRAIN VALVE

Filed Jan. 16, 1961

INVENTOR.
JOHN E. SMITH
BY
*Whittemore, Hulbert*
*& Belknap*
ATTORNEYS

United States Patent Office 3,103,229
Patented Sept. 10, 1963

3,103,229
MANIFOLD DRAIN VALVE
John E. Smith, Rochester, Mich., assignor to Holley Carburetor Company, Warren, Mich., a corporation of Michigan
Filed Jan. 16, 1961, Ser. No. 82,816
2 Claims. (Cl. 137—107)

This invention relates generally to a turbine engine, and more specifically to means for removing fuel from the burner section of the turbine engine upon engine shutdown.

Generally, in an aircraft turbine engine, a fuel manifold is provided therein which has individual nozzles for distributing fuel within the burner chamber. The conventional practice of supplying fuel to the manifold is through a fuel control assembly which meters the fuel in accordance with engine demands from where the fuel flows through a suitable conduit at the underside of the engine and finally connects with the fuel manifold at the lowermost point thereof.

As a result of this general arrangement, whenever the engine is shut down, the fuel contained within the fuel manifold runs out of the nozzles and puddles at the bottom of the burner chamber of the turbine engine. This in turn causes localized "hot spots" resulting in a substantial deterioration of components within the immediate vicinity of the puddles at the bottom of the burner chamber.

The reason that the fuel flows out of the nozzles in the manner just described is because at engine shutdown the main metering valve is in a closed position which prevents any backflow of fuel therethrough. However, a pressure head still exists within the fuel manifold and since air can flow into the fuel manifold through the uppermost nozzles, the pressure causes the fuel to drain out through either the bottom-most or through the generally lower nozzles and into the burner section.

Accordingly, it is now proposed to provide automatic means for removing the fuel from within the fuel manifold upon engine shutdown in a manner so as to prevent the aforementioned puddling of fuel.

It is an object of the present invention to provide a fuel control system for a turbine engine which includes automatic means responsive to engine shutdown for removing the fuel from within the fuel manifold to the burner chamber of the turbine engine so as to prevent puddling of the fuel at the bottom of the burner chamber.

Another object of the present invention is to provide a fuel control system for a turbine engine which includes automatic means responsive to an engine condition for supplying fuel to and removing fuel from the fuel manifold of the burner chamber of the engine upon predetermined engine conditions, said automatic means including a pair of pressure responsive members, one of said members connected between a source of fuel and the burner chamber to supply fuel upon engine demands, and the other of said members connected between the burner chamber and a return reservoir and being closed while said one member is open, said other member being responsive to a condition determined by the shutdown of the engine to open and thereby permit reverse flow of fuel from the fuel manifold of the burner chamber to the reservoir, while said one member closes to block flow of fuel to said fuel manifold.

A still further object of the present invention is to provide a fluid valve including a pair of pressure responsive members, each member being responsive to a different predetermined pressure condition to open and permit fluid flow therethrough while being closed upon the attainment of the predetermined pressure condition affecting the other member.

It is thus another object of this invention to provide a simplified low cost structure of the aforementioned type having certain advantages contributing to efficiency, reliability and long life as well as ease of maintenance.

Other objects and features of the invention will become apparent as the description proceeds, especially when taken in conjunction with the accompanying drawing, illustrating a preferred embodiment of the invention, wherein.

Figure 1:
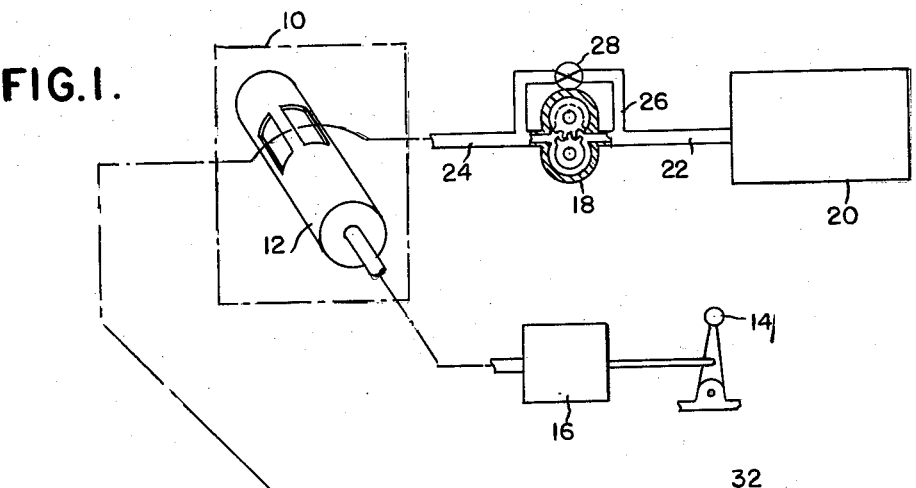
FIGURE 1 is a schematic illustration of a fuel control system.
Figure 2:
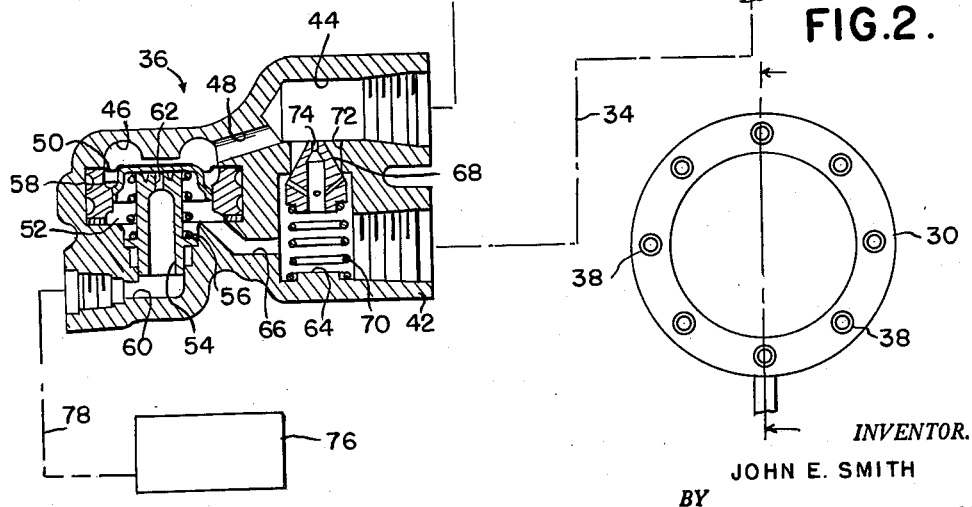
FIGURE 2 is a front view of the nozzle assembly taken on line 2—2 of FIGURE 1.

FIGURE 1 schematically illustrates a fuel control 10 containing a main metering valve 12 therein which may be positioned in accordance with the angle of the pilot selector lever 14 as modified by the device 16 which is a schematic representation for the other influencing parameters such as speed, pressure, temperature, etc. A fuel pump 18 delivers fuel from the reservoir 20 by means of conduits 22 and 24 to the fuel control 10 and the main metering valve 12. The bypass conduit 26 and a constant pressure valve 28 connected serially therein may be provided in order to maintain a relatively stable fuel pressure at the entrance to the fuel control 10.

A fuel manifold ring 30 is illustrated within a fragmentary portion of a turbine engine 32 and is connected by a suitable conduit 34 to the valve means 36. The fuel manifold 30 is comprised generally of a circular ring portion having a plurality of nozzles 38 formed thereon which may include calibrated flow restrictions therein for delivering fuel to the burner chamber. The valve assembly 36, in addition to being connected as by conduit 34 to manifold 30, is also connected as by conduit 40 to the metered fuel discharge portion of the fuel control 10.

The valve assembly 36 is comprised generally of a housing 42 having the fuel entrance conduit 44 which communicates with the chamber 46 by means of conduit 48. Chamber 46 is formed generally by the cooperation of housing 42 and diaphragm member 50.

Chamber 52 formed generally by the housing 42 and diaphragm 50 contains a valve-seat-like member 54 and a spring 56 which urges a slidable valving member 58 upwardly against diaphragm 50. Whenever valving member 58 is raised off of member 54, chamber 52 is brought into communication with conduit 60 as by means of a conduit portion 62 formed in member 54. Chamber 52, however, is in constant communication with chamber 64 by virtue of conduit 66. Chamber 64 contains a cone-like valve member 68 therein which is urged upwardly by spring 70 so as to normally urge the valve 68 toward a position closing passage 72 which communicates between conduit 44 and chamber 64. A restricted passage or jet 74 is provided within the member 68 so as to always allow a slight flow from conduit 44 to chamber 64 which in turn is in continual communication with conduit 34. Drain tank 76 is a schematic representation of a drain reservoir which is connected to conduit 60 of valve assembly 36 by conduit or passage 78. The drain tank 76 is of limited capacity due to space limitations and is provided only to collect any unavoidable fuel leakage.

The main purpose of the invention is to drain any fuel in the manifold 30 back to the drain tank 76 when the engine has been shut down. However, in designing such a valve assembly 36, it is necessary to be mindful of the operation of the valve assembly 36 on starting the engine; that is, the slidable valving member 58 must be closed quickly before valve member 68 opens to prevent any fuel passing through jet 74 from passing to the drain tank 76.

In actual practice, the valve member 68 operates on a pressure differential of about 15 p.s.i., while the valve member 58 operates on a pressure differential of about 6 p.s.i. These are not necessary values, however, so long as valve member 58 operates on a lower pressure differential than valve member 68. In view of this arrangement and the other structural details, including the provision of jet 74, the sequence of operation on starting the engine is that the valve member 58 closes first and then the valve member 68 opens. During subsequent operation of the engine, valve member 58 remains closed while the valve member 68 remains open.

The operation of valve members 58 and 68 is dependent upon pressure differentials, and not upon actual absolute pressures; that is, the drain valve system operates by sensing when fuel is started to be delivered to the engine and when fuel delivery to the engine is being stopped.

The operation of valve members 58 and 68 provides a "relaying action." In other words, the operation or the setting of one valve causes the other valve to operate. Valve member 68 tells when fuel is flowing to the engine; its position gives a positive action on tripping of valve member 58. More specifically, valve member 68 will not open until valve member 58 is closed; conversely, valve member 58 will not open until valve member 68 has closed on engine shut down.

Assuming the engine to be running, the overall operation of the fuel system may be described in the following manner. Fuel at a relatively higher pressure is continually pumped through the main metering valve 12 from where it flows through conduit 40 into conduit 44 of the valve assembly 36. The fuel so pumped therein is prevented from flowing through chamber 46 because of the existence of diaphragm 50 therein. Consequently, the high pressure fuel forces valve member 68 against spring 70, thereby opening passage 72 and allowing flow of fuel therethrough into the conduit 34 which connects chamber 64 to the fuel manifold 30.

The flow through passage 72 results in some pressure drop, thereby causing the pressure in chamber 64 to be somewhat less than the pressure of the fuel in conduit 44. As a result of this, the fuel in chamber 64 is prevented from flowing through conduit 60 and into reservoir 76 because the pressure drop existing across diaphragm 50 is sufficient to offset the spring force of spring 56 tending to open passage 62. As a result of the above, fuel is forced through conduit 34 into the fuel manifold 30, out through the restrictive nozzles 38 and into the burner chamber.

On shutting down the engine, the valve member 68 closes first, and very shortly thereafter, the valve member 58 opens. Jet 74 is provided to allow a rapid movement of diaphragm 50 in the upward direction to open the conduit 62 provided in the member or poppet 54 on engine shutdown. This is necessary because spring 56 operates at 6 p.s.i. and obviously couldn't overcome the 15 p.s.i. calibration of valve 68.

The reliability of the dump valve is insured in the event the diaphragm 50 should fail since the valve member 58 is actually a piston with an area substantially equal to the diaphragm effective area. In other words, the piston will supply the force necessary to seal off the drain passage on starting.

When the engine is shut down, the metering valve 12 is caused to move into a closed position, thereby preventing a flow of fuel therethrough in either direction. When this happens, the previously existing high pressure drop from chamber 44 to chamber 64 diminishes rapidly and valve member 68 closes, whereupon the previously existing pressure drop across diaphragm 50 is totally destroyed by virtue of the restrictive passage 74 which bleeds off the remaining differential pressure.

As a result of this, spring 56 moves valve member 58 upwardly, thereby opening passage 62. With the passage 62 being opened, there is less restriction to flow therethrough than there is through the respective nozzles 38 because of the calibrated restrictions built into them.

Consequently, the fuel existing in the fuel manifold 30 at the time of engine shutdown does not flow out through the nozzles 38 and into the burner section, but rather reverses flow through the conduit 34 and into chamber 52 of the valve 36 from where the fuel flows through passage 62 and conduits 60 and 78 into the reservoir 76. The little amount of fuel that may possibly drain out of the nozzles 38 and into the burner section is such that can be evaporated and blown out of the engine during the coasting period of the compressor within the engine; that is, the flow of fuel is terminated instantly by the closing of the main metering valve 12. However, there is some considerable time interval after closing of the main metering valve 12 before the compressor finally comes to a stop and any small amounts of fuel so drained through nozzles 38 would be removed by the air forced through the engine as a result of the compressor coasting.

I have thus provided a manifold drain valve which functions in a manner to drain the fuel manifold supplying the nozzles right after the fuel is shut off at the fuel control, thereby preventing fuel from trickling into the engine and making hot spots therein after the compressor air stops flowing. In addition, the valve operates in a manner to quickly close when fuel is delivered so as not to waste fuel through the drain line.

The invention is characterized by its design which requires only one high pressure to atmosphere seal. A low pressure diaphragm is provided for reliability. The check valve addition provides for a hydraulic relay such that one action initiates a second action so that absolutely no fuel is lost through the drain line during the starting of the engine. This relay action minimizes leakage and assures reliable operation under varying and unpredictable operating conditions.

The drawing and the foregoing specification constitute a description of the improved manifold drain valve in such full, clear, concise and exact terms as to enable any person skilled in the art to practice the invention, the scope of which is indicated by the appended claims.

What I claim as my invention is:

1. A liquid drain valve adapted to be connected in a fuel system between a metered fuel supply source and a manifold or like discharge line to control drainage from said discharge line to a low pressure drain line, said valve comprising a body having intake and discharge passages adapted to be connected respectively to said source and discharge line, a valve passage in said body through which said passages may communicate, said valve passage being provided with a valve seat, a shiftable valve member in said valve passage controlling flow across said valve seat and out of engagement with the latter under normal operating pressure from said source, a chamber in said body lateral to said valve passage and in communication with said intake passage under pressure in the latter and in part defined by a movable wall, said body having drainage passage means adapted to communicate said discharge passage and drain line, said drainage passage means being controlled by a part of said movable wall to open and close communication of said discharge passage with said drainage passage means from a point downstream of said valve seat, resilient means respectively biasing, with greater and lesser force, said valve member against said valve seat and said movable wall in a direction to cause said part of the latter to open said drainage passage means, said resilient means acting in each case against fluid pressure in said communicated intake passage and chamber, and a bleed passage bypassing said valve member to communicate said intake passage and chamber with said discharge passage and said drainage passage means for the rapid dropping of pressure in said intake passage and chamber when normal operating pressure from said metered fuel supply source is discontinued.

2. A liquid drain valve in accordance with claim 1, in which said passage means includes a tubular valve seat having an opening in communication with said drainage passage means and normally closed by said movable wall part under said normal operating pressure, and a passage communicating said discharge passage with said opening when the latter is opened by said part.

References Cited in the file of this patent

UNITED STATES PATENTS

| | | |
|---|---|---|
| 1,476,739 | Torngren | Dec. 11, 1923 |
| 2,573,724 | Neal | Nov. 6, 1951 |
| 2,626,655 | Trautman et al. | Jan. 27, 1953 |
| 2,643,739 | Tear | June 30, 1953 |
| 2,741,301 | Lines | Apr. 10, 1956 |
| 2,814,180 | Hession | Nov. 26, 1957 |
| 2,846,845 | Parker | Aug. 12, 1958 |
| 2,929,394 | Wenner | Mar. 22, 1960 |